(12) United States Patent
Kitamura

(10) Patent No.: US 6,480,647 B1
(45) Date of Patent: Nov. 12, 2002

(54) WAVEGUIDE-TYPE WAVELENGTH MULTIPLEXING OPTICAL TRANSMITTER/RECEIVER MODULE

(75) Inventor: Naoki Kitamura, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/324,991

(22) Filed: Jun. 2, 1999

(30) Foreign Application Priority Data

Jun. 4, 1998 (JP) .......................................... 10-156133

(51) Int. Cl.[7] ................................................. G02B 6/28
(52) U.S. Cl. .............................. 385/24; 385/42; 385/45; 385/47
(58) Field of Search .............................. 385/39, 42, 43, 385/45, 47, 31, 50, 27, 24, 14, 48, 15, 46, 41, 44

(56) References Cited

U.S. PATENT DOCUMENTS

| 5,799,120 A | * | 8/1998 | Kurata et al. | 385/45 |
| 5,825,951 A | * | 10/1998 | Kitamura | 385/45 |
| 6,175,670 B1 | * | 1/2001 | Bergmann | 385/14 |
| 6,243,516 B1 | * | 6/2001 | Seino | 385/47 |

FOREIGN PATENT DOCUMENTS

| JP | 61-242069 | 10/1986 |
| JP | 63-85607 | 4/1988 |
| JP | 63-205612 | 8/1988 |
| JP | 5-157935 | 6/1993 |
| JP | 6-69572 | 3/1994 |
| JP | 7-168038 | 7/1995 |
| JP | 9-105824 | 4/1997 |
| JP | 09159851 | 6/1997 |
| JP | 11-68705 | 3/1999 |
| JP | 11-202140 | 7/1999 |
| JP | 11-248954 | 9/1999 |

OTHER PUBLICATIONS

Japanese Office Action issued Aug. 1, 2000 in a related application with English–language translation of relevant portions.

* cited by examiner

Primary Examiner—Frank G. Font
Assistant Examiner—Michael P. Mooney
(74) Attorney, Agent, or Firm—Dickstein, Shapiro, Morin & Oshinsky, LLP.

(57) ABSTRACT

There is disclosed a waveguide-type wavelength multiplexing optical transmitter/receiver module which is composed of an optical demultiplexer having an optical waveguide substrate and a filter disposed on an optical waveguide substrate, a laser diode and a photodiode. On the optical waveguide substrate, a first optical waveguide and a second waveguide are formed. On a first end face of the optical waveguide substrate, there is a cross section in which these optical waveguides cross each other. On a second end face of the optical waveguide substrate, there is an optical fiber and ports for connecting the laser diode. The filter reflects light with a wavelength of $\lambda 1$ from the laser diode and allows light with a wavelength of $\lambda 2$ from the optical fiber to pass therethrough. The laser diode is so disposed that the location of a center axis is shifted in the direction of the first optical waveguide relative to a cross axis being normal to a first end face. The photodiode does not receive an unwanted light with a wavelength of $\lambda 2$ or so from the laser diode. The waveguide-type wavelength multiplexing optical transmitter/receiver module having excellent light receiving characteristics is realized.

20 Claims, 12 Drawing Sheets

WAVEGUIDE-TYPE WAVELENGTH MULTIPLEXING OPTICAL TRANSMITTER/RECEIVER MODULE

BACKGROUND OF THE INVENTION

1. Field of the Invention

The present invention relates to optical communications and more particularly to a waveguide-type wavelength multiplexing optical transmitter/receiver module used for wavelength multiplexing transmission.

2. Description of the Related Art

In recent years, the need for bidirectional optical communications has increased and the adaptation of this system to home use has long been desired as well. To establish bidirectional optical communications, an optical transmitter and an optical receiver are required. However, the, separate or discrete construction of these two devices inevitably causes upsizing of an optical transmitting and receiving system, hindering the widespread use thereof. Furthermore, it is not economical to lay two optical fibers for sending and receiving for home use; and therefore, it is essential to establish bidirectional communications by employing only one optical fiber.

To do communications with one optical fiber, a device such as an optical transmitter and receiver intended for the home which can be connected to one optical fiber is required.

At this point, it is necessary to isolate an upward signal light from individual households from a downward signal light from a station.

For isolating the upward signal light from the downward signal light, there is a method in which two types of light each having a different wavelength are used. Accordingly, an optical demultiplexer is required which is able to differentiate a wavelength of light signal outputted from a light transmitter from that inputted to a light receiver. In addition, the device having such functions must be small-sized and low-priced for individual households. To meet these requirements, the integration of an optical transmitter, receiver and de-multiplexer into one device is essential. With this in mind, for the purpose of making the device small-sized, highly-integrated and low-priced, the use of an optical waveguide has been investigated. A silica glass waveguide in particular has been generally employed owing to its small propagation loss and excellent coupling efficiency to an optical fiber. Though the silica glass waveguide itself has no property of sending or receiving light, as a method for highly efficient coupling to a laser diode (LD) being an optical transmitter or a photodiode (PD) being an optical receiver has been recently developed; its importance as an optically packaged substrate is increasingly recognized. In the past, the coupling of the LD to the optical waveguide was impossible due to a very big coupling loss caused by a difference in spot size. However, the LD allowing changes in its spot size has been recently developed, providing a high efficiency in coupling to the optical waveguide.

In the case of a PD, owing to its relatively large light-receiving area of about 80–100 $\mu$m, the coupling to an optical waveguide can be easily implemented.

An optical transmitter/receiver module having an optical demultiplexer composed of an optical waveguide disclosed in Japanese Laid-open Patent Application No. Hei 9-105824 has been known in the art.

FIG. 11 shows the conventional waveguide-type wavelength multiplexing optical transmitter/receiver module described in the above Japanese Provisional Publication.

As depicted in FIG. 11, if there is light with two types of wavelengths, for example, $\lambda 1$ and $\lambda 2$, a dielectric multilayer filter 108 is so configured as to allow the light with one wavelength to pass therethrough and reflect the light with the other wavelength. The demultiplexing function of this module has been achieved by providing, using:a dicing process, a groove 107 in optical waveguides 110, 111 and 112 formed on a substrate 109 and by inserting the dielectric multilayer filter 108 into the groove 107.

The light with a wavelength of $\lambda 2$ from a port 101 passes through the dielectric multilayer filter 108 and is outputted from a port 103 while the light with a wavelength of $\lambda 1$ from a port 102 reflects off of the dielectric multilayer filter 108 and is outputted from the port 101.

Thus, the wavelength multiplexing optical transmitter/receiver module has been implemented by connecting an optical fiber 104 to the port 101 of the optical demultiplexer and by connecting each of the LD 105 and PD 106 to a port 102 and 103 respectively.

An optical transmitter/receiver module having an optical demultiplexer composed of an optical waveguide disclosed in Japanese Laid-Open Patent Application No. Hei 09-159851 has been known in the art as another example.

FIG. 12 shows the conventional waveguide-type wavelength multiplexing optical transmitter/receiver module described in the above Japanese Provisional Publication.

Referring to FIG. 12, a dielectric multilayer filter 208 has properties of reflecting light of a wavelength of $\lambda 1$ and allowing light of a wavelength of $\lambda 2$ to pass therethrough.

Two optical waveguides 210 and 211 are formed on a substrate 209, and one end of the optical waveguide 211 is connected to an optical fiber 204 on a port 201 while one end of the optical waveguide 210 is connected to a LD 5 at a port 202.

The other end of each of the optical waveguides 210 and 211 are positioned so that they converge at an end of the substrate 209 to constitute a directional coupler 212.

The directional coupler 212 is adapted to provide one-half coupling length of a perfect coupling length to light with a wavelength of $\lambda 1$ outputted from a LD 205 connected to one end of the optical waveguide 210.

The demultiplexing function of this module has been thus achieved by affixing the dielectric multilayer filter 208 through a transparent substrate 213 to an end face of the side of the substrate 209 where the directional coupler 212 is formed thereon.

The light with a wavelength of $\lambda 1$ outputted from the LD 205 propagates through the optical waveguide 210 and, after entering the directional coupler 212, reflects off this dielectric multilayer filter 208 and is outputted to the optical waveguide 211 and then eventually enters the optical fiber 204. On the other hand, the light with a wavelength of $\lambda 2$ from the optical fiber 204 propagates through the optical waveguide 211 and, after entering the directional coupler 212, passes through the dielectric multilayer filter 208 and enters the PD 206 positioned in a backward position and then eventually is received.

However, there are problems to be solved in the conventional module. In the conventional wavelength multiplexing optical transmitter/receiver module having an optical demultiplexer wherein the dielectric multilayer filter as described above is positioned on the optical waveguide, the module has a high function to prevent light with a wavelength of λ1 from the LD 105 from entering the PD 106 (206) by reflecting the light off the dielectric multilayer filter 108 (208). However, the light with a wavelength of λ2 or so from the LD 105, though being generally weak, passes through the dielectric multilayer filter 108 (208), causing all the light to be received by the PD 106 (206).

According to experiments, for example, in the case of a level of an output with a wavelength of λ1 from the LD 105 being 0 dBm (i.e., 1 mW), even if a dielectric multilayer filter is used which is capable of isolating light with a wavelength of λ1 at a level of −50 dB or so, the output level of −40 dBm has been detected at the PD 106(206).

Generally, light receiving characteristics of a photodiode in an optical transmitter/receiver module are determined depending on how low the level of signal light from an optical fiber can be received.

For example, if the level of to-be-received signal light transmitted from an optical fiber is −40 dBm, the level is almost the same as that of to-be-sent signal light transmitted from a LD, making it impossible to differentiate to-be-received light from to-be-sent light.

The level of to-be-received signal light actually transmitted from an optical fiber is about −30 dBm and the to-be-sent signal light transmitted to the PD 106(206) turns out to be a noise, hindering good reception of the signal light.

Accordingly, the optical transmitter/receiver module having such configurations as disclosed in the conventional technology cannot provide good light receiving characteristics and has presented a problem in that the conventional system is difficult to apply to practical use.

SUMMARY OF THE INVENTION

In view of the above, it is an object of the present invention to provide a waveguide-type wavelength multiplexing optical transmitter/receiver module having simplified and low-priced configurations and excellent characteristics.

According to a first aspect of the present invention, there is provided a waveguide-type wavelength multiplexing optical transmitter/receiver module comprising:

an optical demultiplexer;
an optical transmitter;
an optical receiver;
the optical demultiplexer including an optical waveguide substrate and a filter;
whereby the optical waveguide substrate having a first optical waveguide and a second optical waveguide and a cross section wherein the first optical waveguide and the second waveguide cross each other on a first end face of the optical waveguide substrate, the first optical waveguide and the second optical waveguide being disposed in a position opposite to each other relative to a cross axis being normal to the first end face and passing through the cross section, the first optical waveguide having a first port connected to the optical transmitter on a second end of said optical waveguide substrate, the second optical waveguide having a second port connected to an optical fiber;
the filter being disposed on the first end face of the optical waveguide substrate so as to reflect light with a first wavelength from the optical transmitter and to send it to the second optical waveguide and to allow light with a second wavelength from the optical fiber to pass through; and
the optical receiver the center of which is disposed in a shifted position toward the direction of the first optical waveguide relative to the cross axis so as to receive light with a second wavelength passed through the filter.

In the foregoing, a preferable mode is one wherein the optical receiver is disposed so that the location of said center axis is shifted in parallel relative to the cross axis and in the direction of the optical waveguide.

Also, a preferable mode is one wherein the optical receiver is disposed so that the center axis of the optical receiver is in a rotated position in the direction of the first optical waveguide.

Also, a preferable mode is one wherein the optical demultiplexer has a unwanted light removal filter for allowing light with first wavelength from the optical transmitter to pass therethrough and for removing an disposed light.

Furthermore, a preferable mode is one wherein the unwanted light removal filter is interposed between the first port of the first optical waveguide and the cross section.

According to a second aspect of the present invention, there is provided a waveguide-type wavelength multiplexing optical transmitter/receiver module comprising:

an optical demultiplexer;
an optical transmitter;
an optical receiver;
the optical demultiplexer including an optical waveguide substrate and a filter;
the optical waveguide substrate having a first optical waveguide and a second optical waveguide and a cross section wherein the first optical waveguide and the second optical waveguide converge on the first end of the optical waveguide substrate;
a directional coupler adapted to provide one-half coupling length of perfect coupling length to light with a first wavelength from the optical transmitter;
the first optical waveguide having a first port for connecting to the optical transmitter on the second end face of the optical waveguide substrate;
the second optical waveguide having second port for connecting to an optical fiber;
an unwanted light removal filter being somewhere on said first optical waveguide and being disposed between the first port and the directional coupler for allowing light with a first wavelength from the optical transmitter to pass through the filter and removing unwanted light, the filter disposed on first end face of said optical waveguide substrate for reflecting light with a first wavelength from the optical transmitter to send it to the second optical waveguide and for allowing light of a second wavelength from the optical fiber.

In the foregoing, it is preferable that the filter is a dielectric multilayer filter.

Also, it is preferable that the unwanted light removal filter is composed of a directional coupler.

Also, it is preferable that the unwanted light removal filter is composed of a Mach-Zehnder interferometer.

Also, it is preferable the unwanted light removal filter is composed of a dielectric multilayer filter.

A preferable mode is one wherein the unwanted light removal filter is implemented by inserting a dielectric multilayer filter into a groove formed across the first optical waveguide of the optical waveguide substrate.

A preferable mode is one wherein the optical waveguide substrate consists of one of semiconductor compounds including LiNbO3(lithium niobate), Si(silicon), GaAs (gallium arsenide), InP(indium phosphide) substrates.

Also, a preferable mode is wherein said optical transmitter is a laser diode.

Furthermore, a mode is preferable wherein the optical receiver is a photodiode.

BRIEF DESCRIPTION OF THE DRAWING

The above and other objects, advantages and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

First Embodiment

Figure 1:
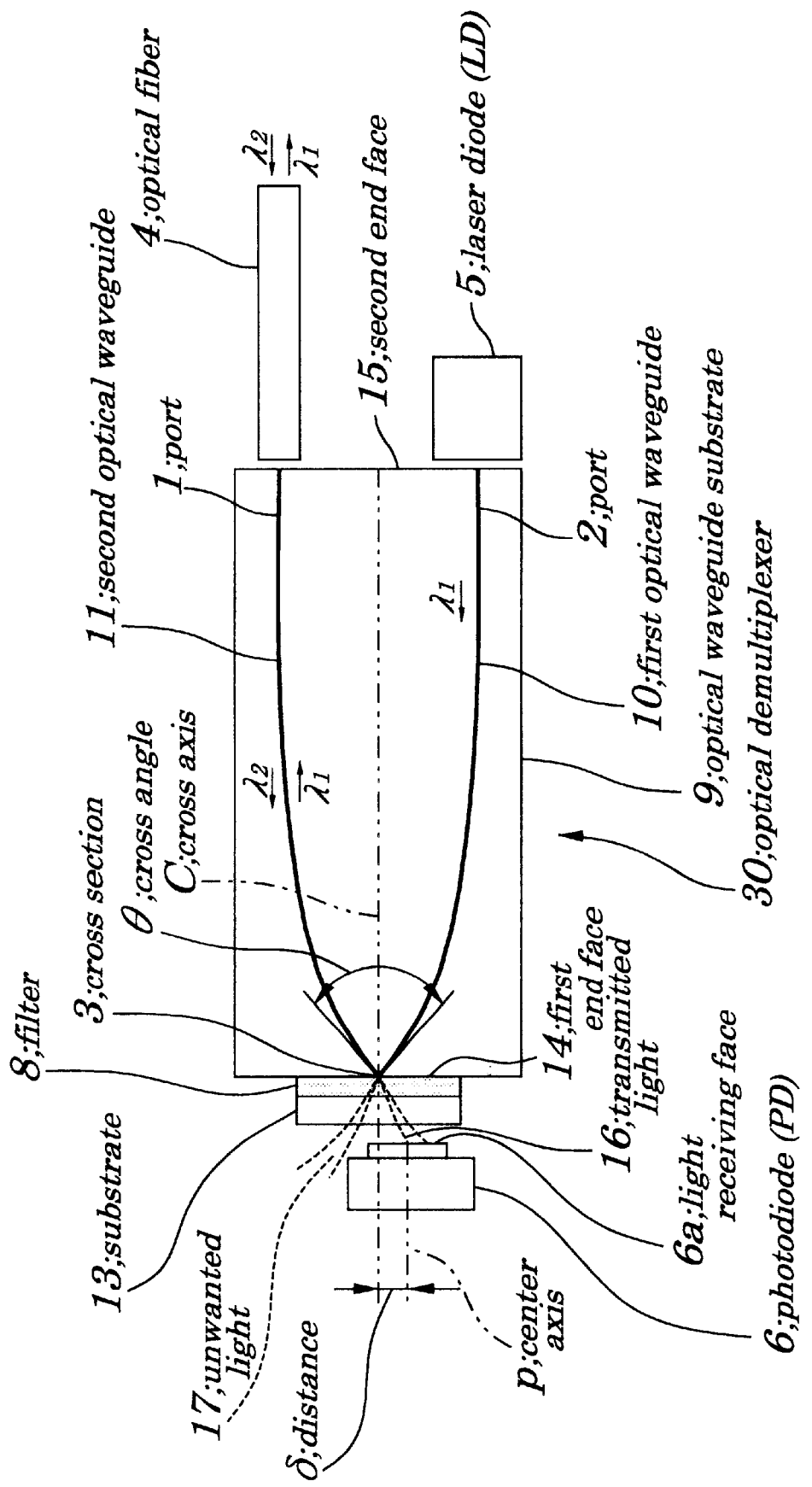
FIG. 1 is a block diagram illustrating a waveguide-type wavelength multiplexing optical transmitter/receiver module according to a first embodiment of the present invention.

FIG. 1 is a block diagram illustrating a waveguide-type wavelength multiplexing optical trans-mitter/receiver module according to a first embodiment of the present invention.

As depicted in FIG. 1, the waveguide-type wavelength multiplexing optical transmitter/receiver module is composed of an optical demultiplexer 30, a LD 5 used as an optical transmitter and a photodiode (PD) 6 as an optical receiver, wherein light with a wavelength of $\lambda 1$, for example, 1.3 $\mu$m from the LD 5 is transmitted to an optical fiber 4 and light with a wavelength of $\lambda 2$, for example, 1.55 $\mu$m from the optical fiber 4 is received by the PD 6.

The optical demultiplexer 30 is composed of an optical waveguide substrate 9 and a filter 8 attached to the optical waveguide substrate 9.

A first optical waveguide 10 and a second optical waveguide 11 are formed on the optical waveguide substrate 9. On a first end face 14 of the optical waveguide substrate 9, there is a cross section 3 where the first optical waveguide 10 and the second optical waveguide 11 cross each other. On a second end face 15 of the optical waveguide substrate 9, there are a port 2 used to connect the first optical waveguide 10 to the LD 5 and a port 1 used to connect the second optical waveguide 11 to the optical fiber 4. The first optical waveguide 10 and the second optical waveguide 11 are disposed in a position opposite to each other relative to a cross axis C which is normal to the first end face 14 and passes through the cross section 3.

A cross angle $\theta$ of the cross section 3 is preferably 10°–30°. This is partially because, if the cross angle is too small, light propagated through the first optical waveguide 10 and reflected off the first end face 14 may be returned again to the first optical guide 10 without being turned to the second optical waveguide 11 and, further, this reflected and returned light may be coupled to the LD 5, causing an undesired phenomenon in which oscillation of the LD 5 becomes unstable. This is also because it is desirable to isolate light propagated through the first optical waveguide 10 from that propagated through the second optical waveguide 11 at a light receiving section of the PD 6.

On the end face 14 of the optical waveguide substrate 9, a specular face is formed which serves to minimize a loss of light on the end face.

Semiconductor compounds such as LiNbO3(lithium niobate), Si(silicon), GaAs(gallium arsenide), InP(indium phosphide) substrates and the like can be used as a material for the optical waveguide substrate 9. The first optical waveguide 10 and second optical waveguide 11 on the optical waveguide substrate 9 are formed by thermally diffusing Ti on the LiNbO3 substrate, or by etching on a silica membrane built up on a Si substrate, or by etching on a semiconductor substrate grown on the semiconductor compounds including GaAs and InP substrates.

The filter 8 has the properties of reflecting light with a wavelength of $\lambda 1$ from the LD 5 and allowing light with a wavelength of $\lambda 2$ from the optical fiber 4 to pass therethrough. Preferably, the filter 8 is a dielectric multilayer filter owing to excellent film properties.

Because the dielectric multilayer membrane constituting the filter 8 is very thin and difficult to handle, as shown in FIG. 1, its handleability is improved by having the dielectric multilayer membrane formed on silica plate substrate 13. The thickness of the silica plate is preferably 50–200 $\mu$m or so when the disposition of the PD 6 to be attached thereto is taken into consideration.

The configuration of the optical demultiplexer 30 is such that the filter 8 is fixed to the first end face 14 so that the cross section 3 lies exactly in the center of the filter 8. This fixing is achieved by optically transparent adhesives such as an epoxy resin adhesive or ultravioletray curing resin adhesive. Care must be taken to make the thickness of the adhesive thinner down to not more than several μm.

Thus, in the optical demultiplexer 30, light with a wavelength of λ1 from the LD 5 is propagated through the first optical waveguide 10 and is reflected off the filter 8 and then is sent to the second optical waveguide 11, while light with a wavelength of λ2 from the optical fiber 4 is propagated through the second optical waveguide 11 and passes through the filter 8 to become transmitted light 16. At this point, feeble light with a wavelength of λ2 or so from the LD 5 passes through the filter 8 to become unwanted light 17.

PD 6 is adapted to receive the transmitted light 16 and not to receive the unwanted light 17. When the PD 6 is disposed so that the location of a center axis p of a light receiving face 6a of the PD 6 is shifted in parallel relative to the cross axis C by a distance δ in the direction of the first optical waveguide 10, the PD 6 receives the transmitted light 16 only and can avoid receiving the unwanted light 17.

An experiment shows that, in the case of the cross angle θ being 20°, the level of power of the unwanted light 17 received by the PD 6 at the distance δ=15 μm is −12 dB relative to that at the distance δ=0, thus enabling the removal of 12 dB in the light power level of the unwanted light 17. In practice, based on the power level of the unwanted light to be removed, the distance δ is determined.

Second Embodiment

Figure 2:
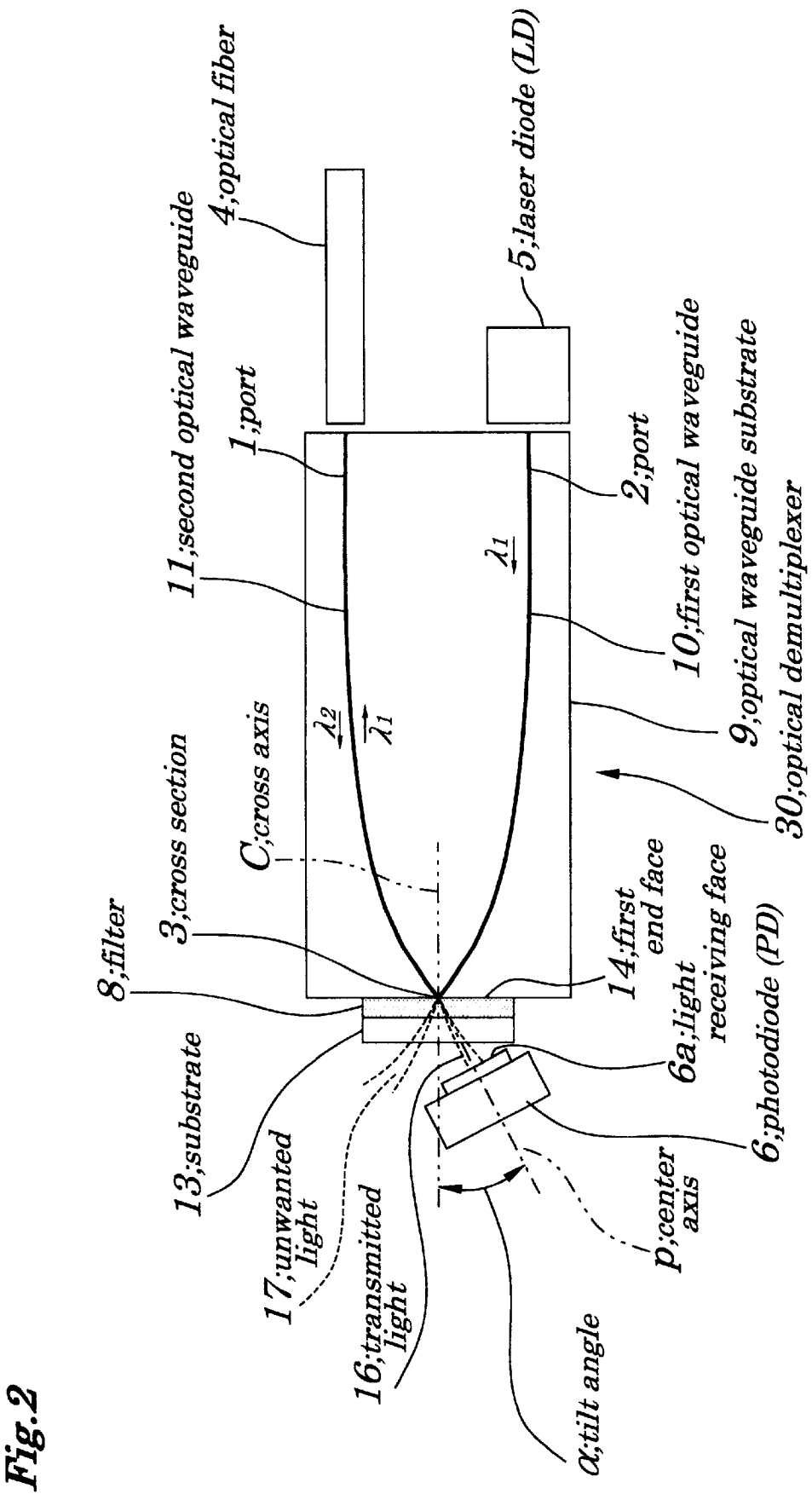
FIG. 2 is a block diagram illustrating a waveguide-type wavelength multiplexing optical transmitter/receiver module according to a second embodiment of the present invention.

FIG. 2 is a block diagram illustrating a waveguide-type wavelength multiplexing optical transmitter/receiver module according to a second embodiment of the present invention. The constitution of the second embodiment differs from that in the Embodiment 1 only in the position of a PD 6. Accordingly, only the position of the PD 6 is described hereinafter. As depicted in FIG. 2, a center axis on a light receiving face 6a of the PD 6 is disposed in a rotated position in the direction of a first optical waveguide 10 by a tilt angle α relative to a cross axis C. This allows the PD 6 to receive only transmitted light 16 and to avoid receiving unwanted light 17.

An experiment shows that the level of power of the unwanted light 17 received by the PD 6 at a tilt angle of 10° is −22 dB relative to a tilt angle of 0°, thus enabling the removal of 22 dB in the light power level of the unwanted light 17.

Third Embodiment

Another embodiment of the waveguide-type wavelength multiplexing optical transmitter/receiver module wherein there is no shift in the position of the PD 6 is described.

Figure 3:
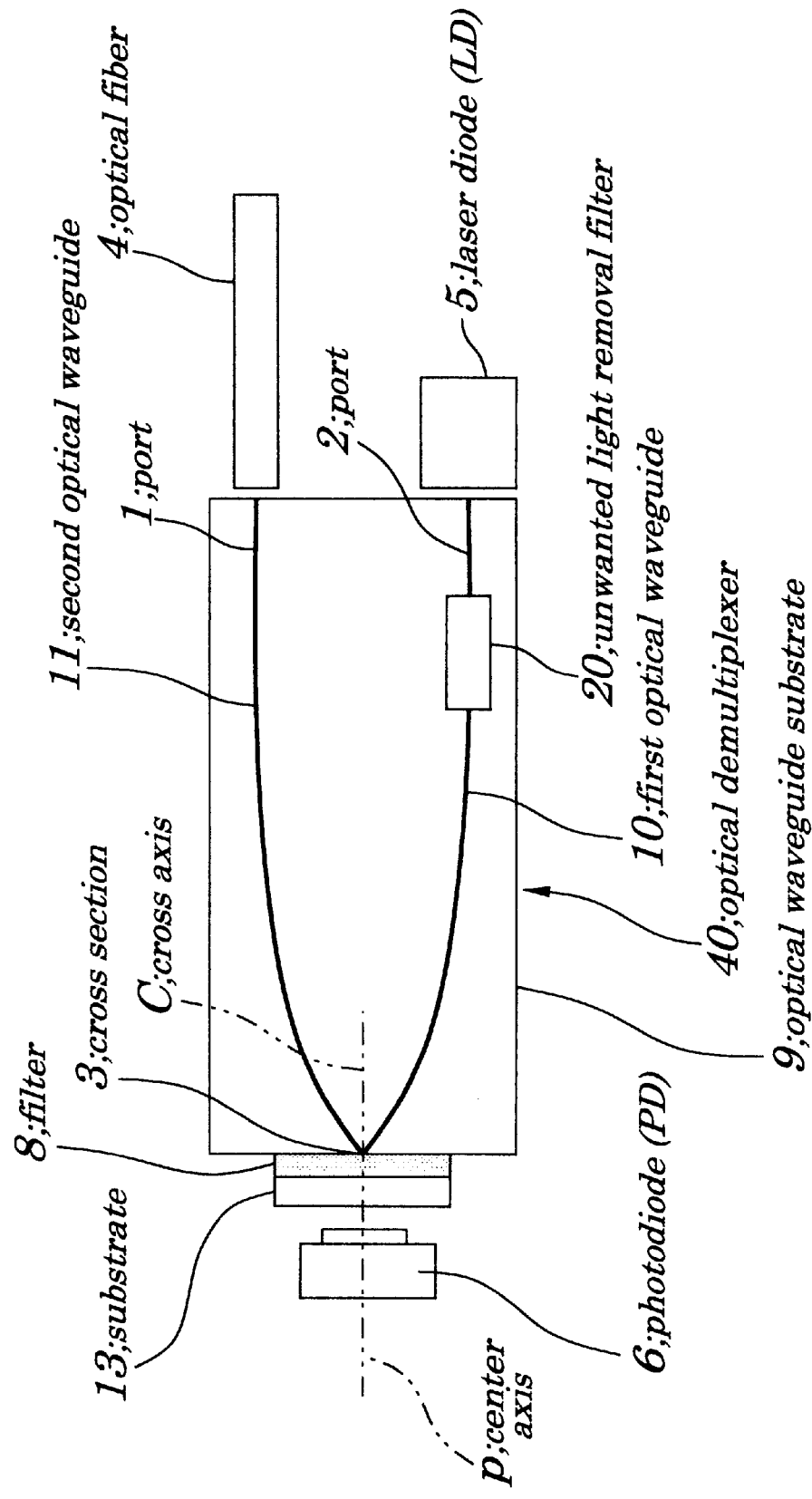
FIG. 3 is a block diagram illustrating the principles of an waveguide-type wavelength multiplexing optical transmitter/receiver module according to a third, fourth and a fifth embodiments of the present invention.

FIG. 3 shows a block diagram illustrating principles of a waveguide-type wavelength multiplexing optical transmitter/receiver module according to a third, fourth and a fifth embodiments of the present invention.

As depicted in FIG. 3, the waveguide-type wavelength multiplexing optical transmitter/receiver module is composed of an optical demultiplexer 40, a LD 5 and a PD 6. The optical demultiplexer 40 includes an optical waveguide substrate 9 and a filter 8 attached to the optical demultiplexer 9. An unwanted light removal filter 20 is interposed between a port 2 of a first optical waveguide 10 on the optical demultiplexer 9 and a cross section 3 so as to remove feeble light with a wavelength length of λ2 or so. The unwanted light removal filter 20 has properties of allowing light with a wavelength of λ1 to pass therethrough and of not allowing light with a wavelength of λ2 to pass.

Accordingly, even if the PD 6 is so disposed that its center axis p lies exactly on a cross axis C, it does not receive unwanted light.

Figure 4:
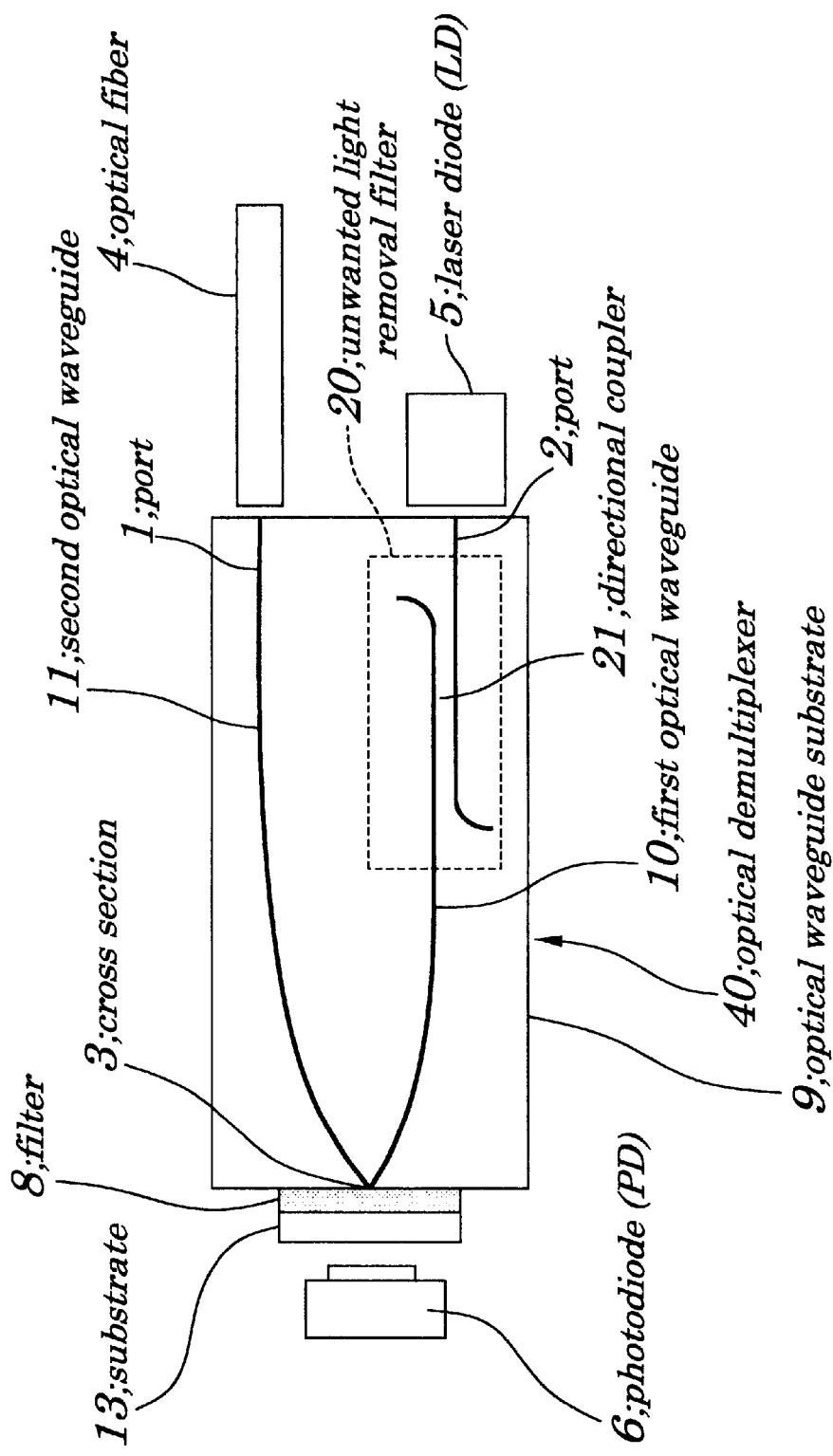
FIG. 4 is a block diagram illustrating a waveguide-type wavelength multiplexing optical transmitter/receiver module according to a third embodiment of the present invention.

FIG. 4 is a block diagram illustrating a waveguide-type wavelength multiplexing optical transmitter/receiver module according to a third embodiment of the present invention.

As depicted in FIG. 4, an unwanted light removal filter 20 is composed of a directional coupler 21. The directional coupler 21 is designed to be adapted to provide a perfect coupling length to light with a wavelength of λ1 from a LD 5. The light with a wavelength of λ1 from a port 2 is perfectly coupled to a first optical waveguide 10 and the unwanted light, contained in the light from the LD 5, with a wavelength of λ2 or so is not coupled to the first optical waveguide 10 and is radiated eventually. Accordingly, a PD 6 does not receive the unwanted light.

Fourth Embodiment

Figure 5:
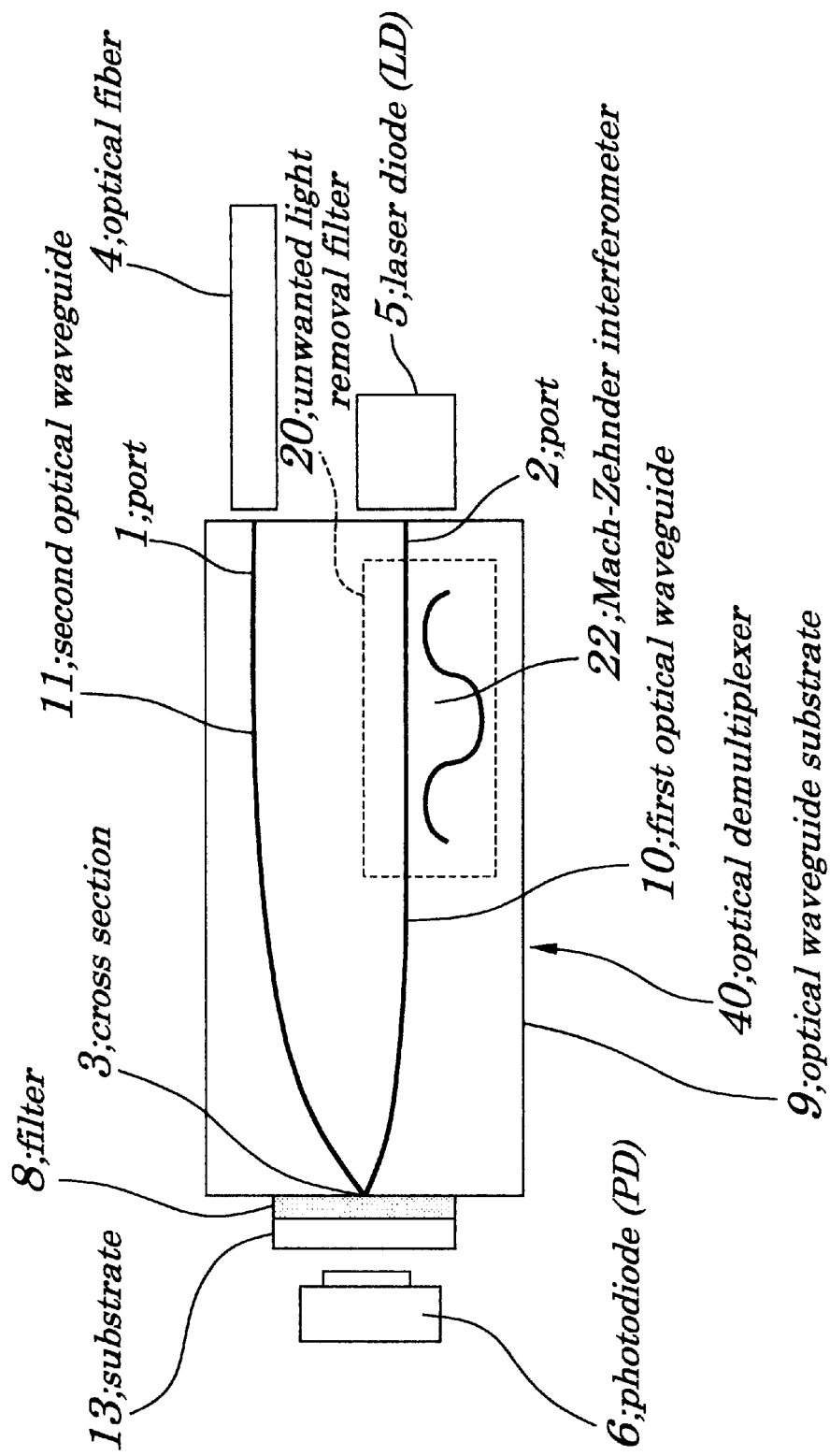
FIG. 5 is a block diagram illustrating a waveguide-type wavelength multiplexing optical transmitter/receiver module according to a fourth embodiment of the present invention.

FIG. 5 shows a block diagram illustrating a waveguide-type wavelength multiplexing optical transmitter/receiver module according to a fourth embodiment of the present invention.

As shown in FIG. 5, an unwanted light removal filter 20 is composed of a Mach-Zehnder interferometer 22. The Mach-Zehnder interferometer 22 couples light with a wavelength of λ1 from a LD 5 to a first optical waveguide 10 and does not couple unwanted light, contained in the light from the LD 5, with a wavelength of λ2 or so to the first optical waveguide 10, and allows the unwanted light to be radiated. Accordingly, a PD 6 does not receive the unwanted light.

Fifth Embodiment

Figure 6:
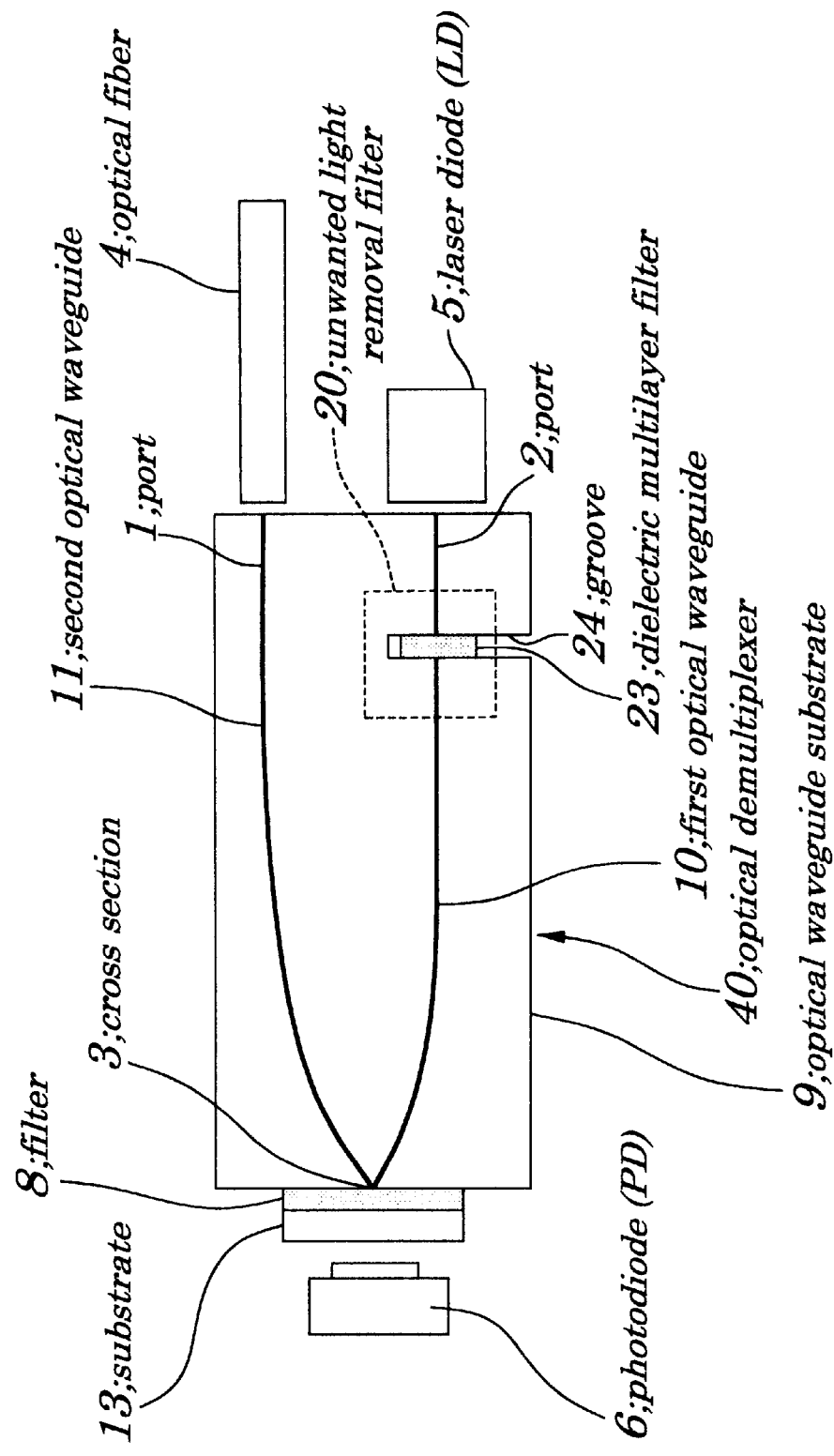
FIG. 6 is a block diagram illustrating a waveguide-type wavelength multiplexing optical transmitter/receiver module according to a fifth embodiment of the present.

FIG. 6 is a block diagram illustrating a waveguide-type wavelength multiplexing optical trans-mitter/receiver module according to a fifth embodiment of the present invention.

As depicted in FIG. 6, an unwanted light removal filter 20 is composed of a groove 24 formed in an optical waveguide substrate 9 and of a dielectric multilayer filter 23 interposed somewhere on a first optical waveguide 10.

The dielectric multilayer filter 23 is adapted to allow light with a wavelength of λ1 from a LD 5 to pass through the filter and to enter a first optical waveguide 10 and not to allow light, contained in the light from the LD, with a wavelength of λ2 or so to pass therethrough.

By forming the groove 24 slant relative to the first optical waveguide 10 and interposing the dielectric multilayer filter 23 slant relative to the first optical waveguide 10, light reflected off the groove 24 and the dielectric multilayer filter 23 can be prevented from reincidence into the LD 5.

Sixth Embodiment

A further embodiment of the waveguide-type wavelength multiplexing optical transmitter/receiver module wherein there is no shift in the position of a PD 6 is described.

Figure 7:
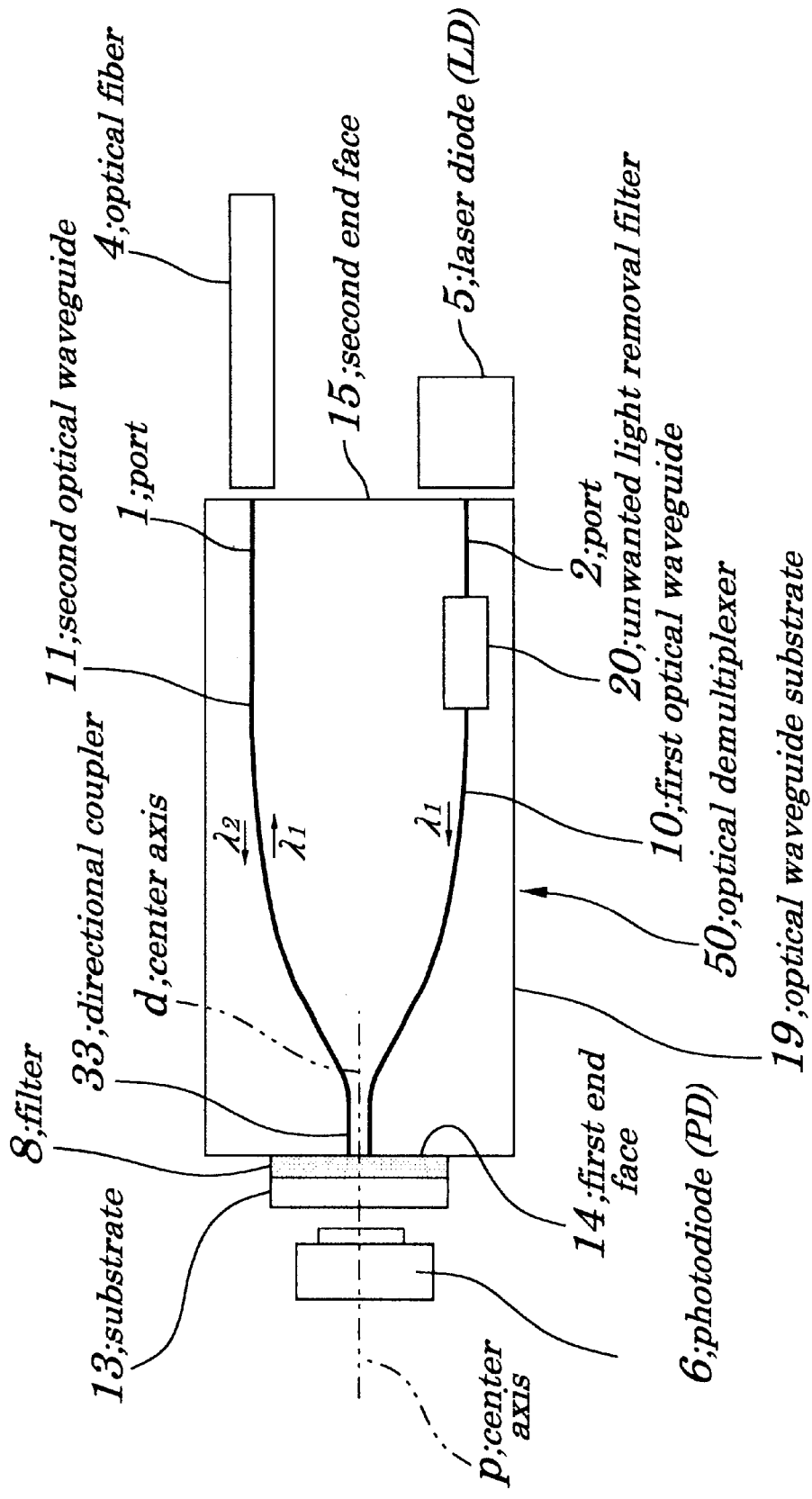
FIG. 7 is a block diagram illustrating principles of an waveguide-type wavelength multiplexing optical transmitter/receiver module according to a sixth, seventh and an eighth embodiments of the present invention.

FIG. 7 is a block diagram illustrating principles of an waveguide-type wavelength multiplexing optical transmitter/receiver module according to a sixth, seventh and an eighth embodiments of the present invention.

As depicted in FIG. 7, the waveguide-type wavelength multiplexing optical transmitter/receiver module is composed of an optical demultiplexer 50, a LD 5 and a PD 6. The optical demultiplexer 50 includes an optical waveguide substrate 19 and a filter 8 attached to the optical waveguide substrate 19.

The configuration of the filter 8 is the same as described in the first embodiment which reflects light with a wavelength of λ1 from the LD 5 and allows light with a length of λ2 from an optical fiber 4 to pass therethrough.

On the optical waveguide substrate 19, an first optical waveguide 10 and a second optical waveguide 11 are formed. On an end face 14 of the optical waveguide substrate 19, a directional coupler is provided wherein the first optical waveguide 10 and the second optical waveguide 11 are disposed coming nearer to each other. The directional coupler 33 is adapted to provide one-half coupling length of a perfect coupling length to light with a wavelength of λ1 from the LD 5. On a second end face 15 of the optical waveguide substrate 19, a port 2 of the first waveguide 10 used for connection with the LD 5 and a port 1 of the second waveguide 11 for connection with the optical fiber 4 are provided. An unwanted light removal filter 20 is interposed between the port 2 of the first optical waveguide 10 on the optical waveguide substrate 19 and the directional coupler 33. The unwanted light removal filter 20 has properties of allowing light with a wavelength of λ1 to pass therethrough and of not allowing light with a wavelength of λ2 to pass. The PD is so disposed that a center axis p lies exactly in the center of the PD.

Thus, in the waveguide-type wavelength multiplexing optical transmitter/receiver as described above, the light with a wavelength of λ1 from the LD 5 passes through the unwanted light removal filter 20, propagates through the first optical waveguide 10, enters the directional coupler 33, reflects off a filter 8, enters the second optical waveguide 11, propagates through the first optical waveguide 11 and eventually enters the optical fiber 4. The feeble light with a wavelength of λ2 or so from the LD 5 is. rejected by the unwanted light removal filter 20. On the other hand, the light with a wavelength of λ2 from the optical fiber 4 propagates through the first optical waveguide 11, enters the directional coupler 33 and further passes through the filter 8, and eventually the light is received by the PD 6.

Figure 8:
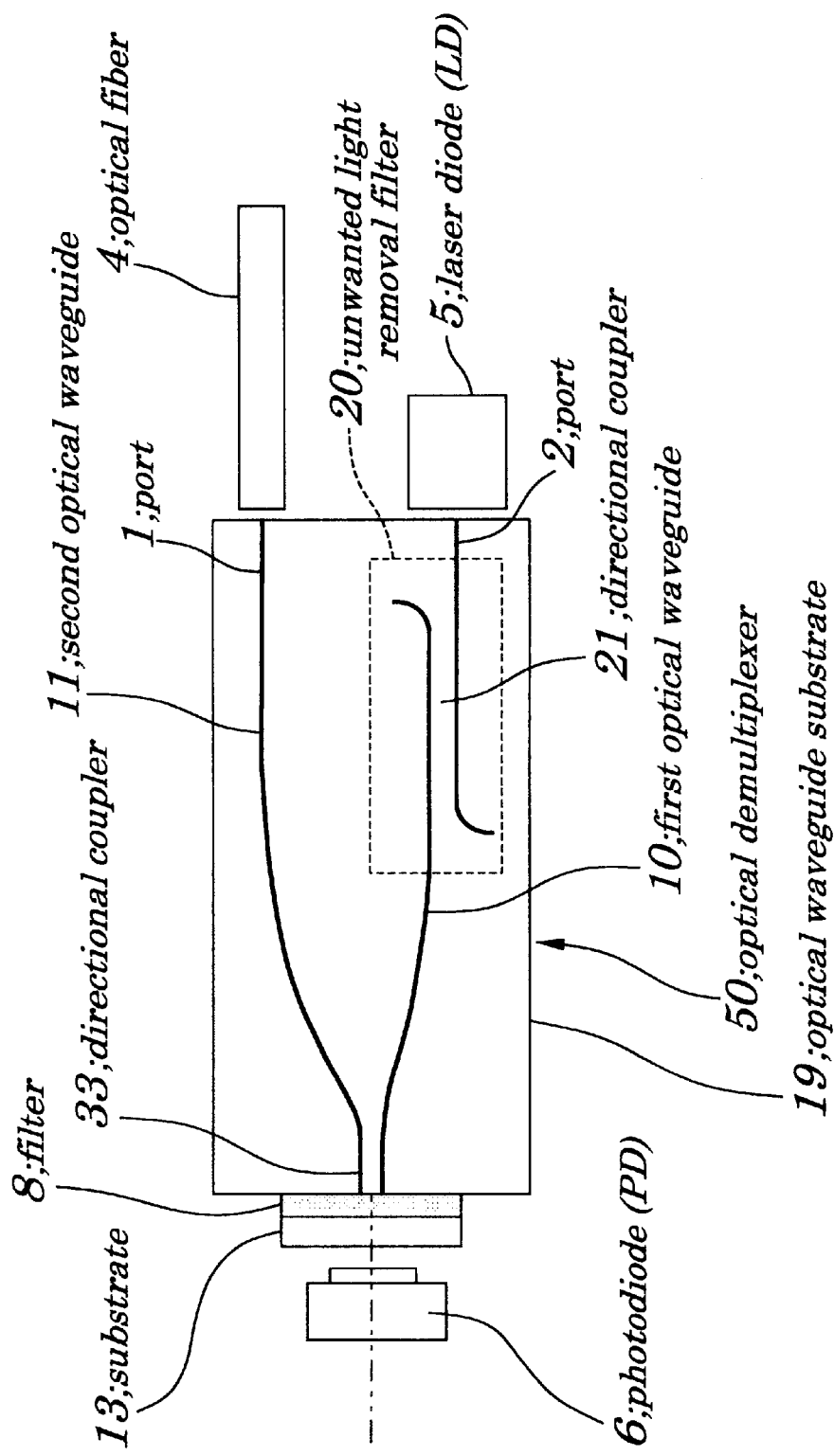
FIG. 8 is a block diagram illustrating a waveguide-type wavelength multiplexing optical transmitter/receiver module according to a sixth embodiment of the present invention.

FIG. 8 is a block diagram of the sixth embodiment illustrating a waveguide-type wavelength multiplexing optical trans-mitter/receiver module of the present invention.

As depicted in FIG. 8, an unwanted light removal filter 20 is provided with a directional coupler 21. The directional coupler 21 is adapted to provide a perfect coupling length to light with a wavelength of λ1 from a LD 5. The light with a wavelength of λ1 from a port is fully coupled to a first optical waveguide 10 and an unwanted light with a wavelength of λ2 or so contained in light from the LD 5 is radiated without being coupled to the first optical waveguide 10 accordingly.

Seventh Embodiment

Figure 9:
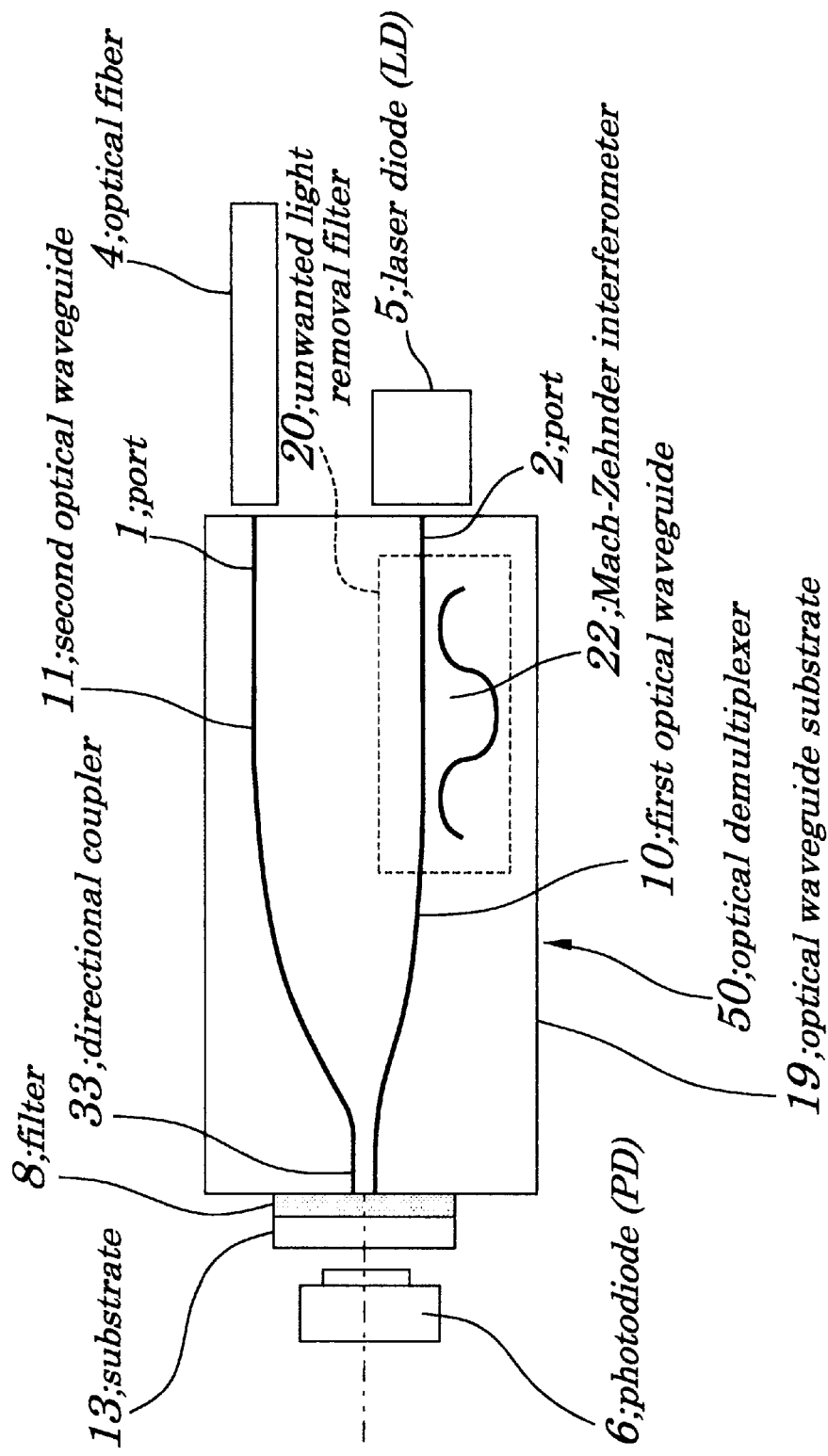
FIG. 9 is a block diagram illustrating a waveguide-type wavelength multiplexing optical transmitter/receiver module according to a seventh embodiment of the present invention.

FIG. 9 is a block diagram illustrating a waveguide-type wavelength multiplexing optical transmitter/receiver module according to a seventh embodiment of the present invention.

As shown in FIG. 9, an unwanted light removal filter 20 is provided with a Mach-Zehnder interferometer 22. The Mach-Zehnder interferometer 22 is adapted to cause light with a wavelength of λ1 from a LD 5 to be coupled to a first optical waveguide 10 and unwanted light with a wavelength of λ2 or so contained in light from the LD 5 to be radiated without causing it to be coupled to the first optical waveguide 10.

Eighth Embodiment

Figure 10:
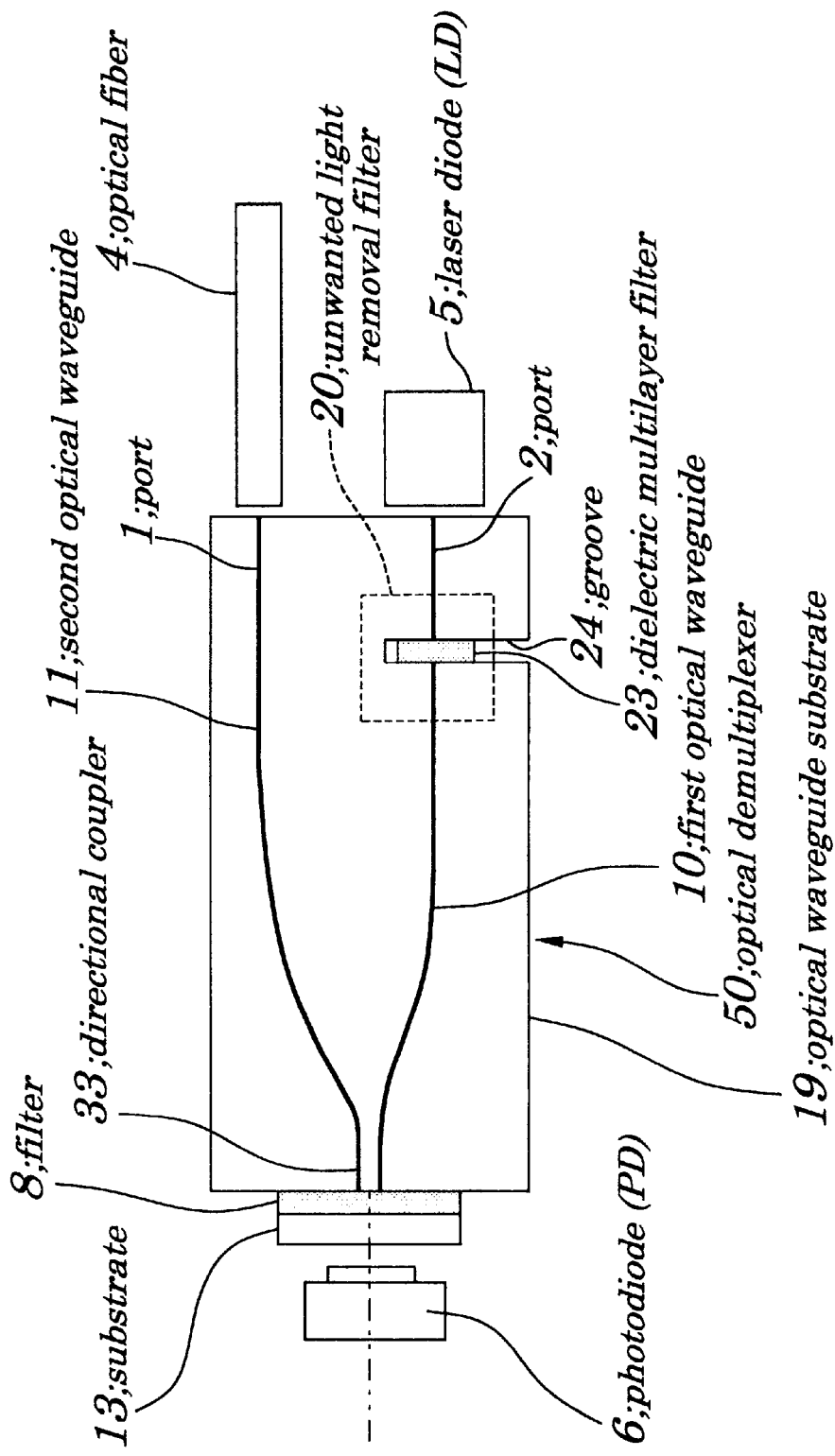
FIG. 10 is a block diagram illustrating a waveguide-type wavelength multiplexing optical transmitter/receiver module according to an eighth embodiment of the present invention.
Figure 11:
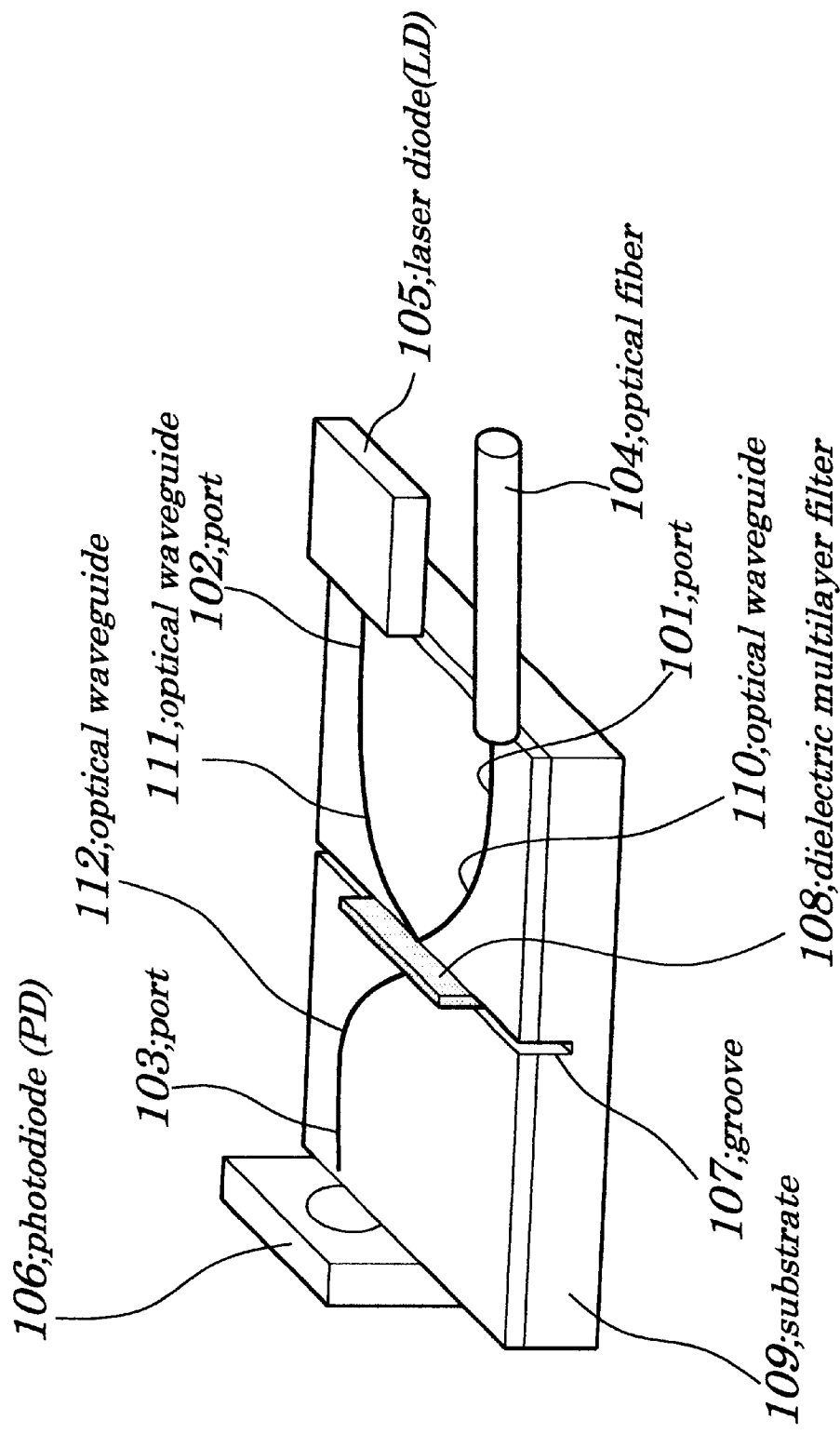
FIG. 11 is a block diagram showing a conventional waveguide-type wavelength multiplexing optical transmitter/receiver.
Figure 12:
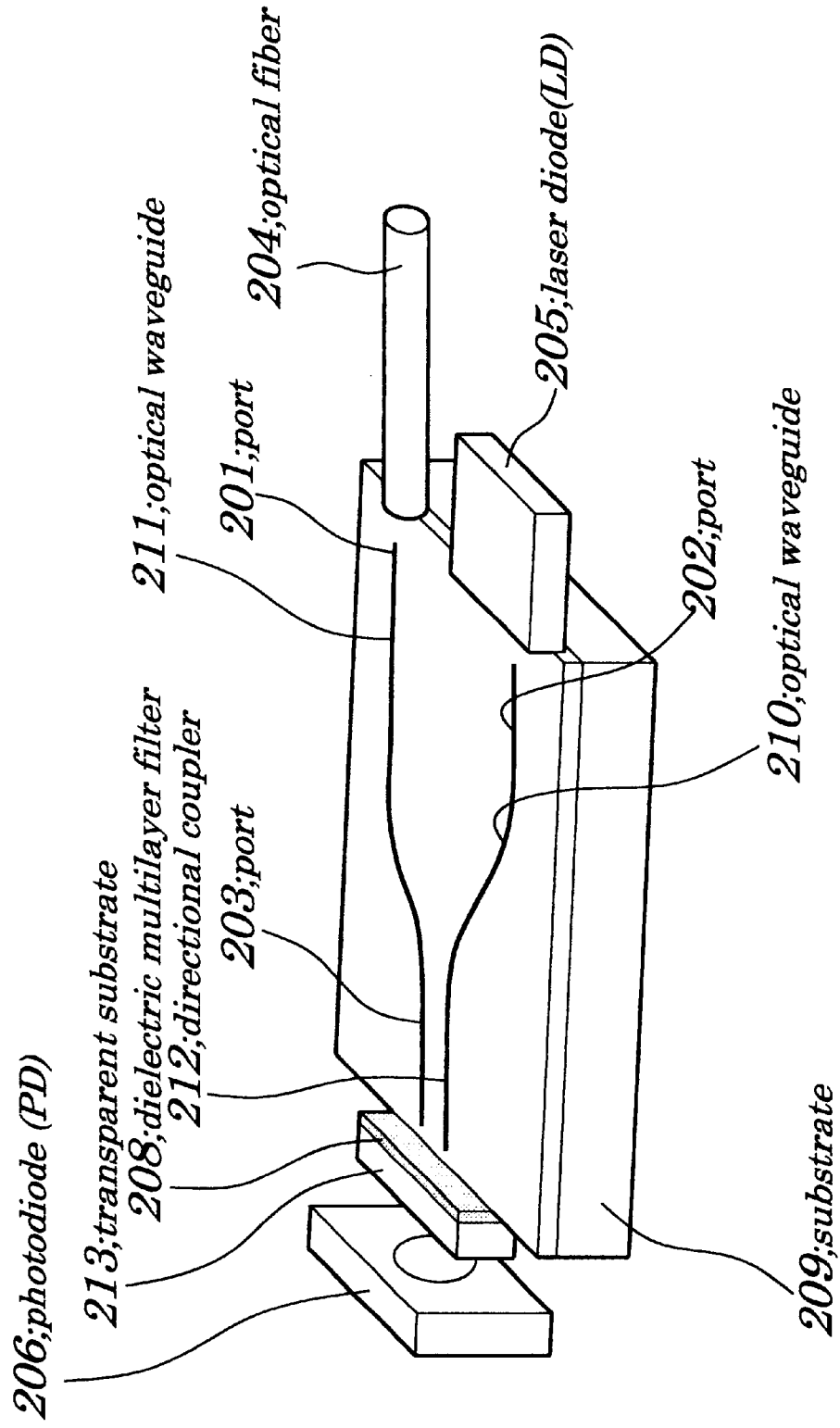
FIG. 12 is a block diagram showing another conventional waveguide-type wavelength multiplexing optical transmitter/receiver.

FIG. 10 is a block diagram illustrating a waveguide-type wavelength multiplexing optical transmitter/receiver module according to an eighth embodiment of the present invention.

As depicted in FIG. 10, an unwanted light removal filter 20 is composed of a groove 24 formed in an optical waveguide substrate 9 and of a dielectric multilayer filter 23 interposed somewhere on a first optical waveguide 10.

The dielectric multilayer filter 23 is adapted to allow light with a wavelength of λ1 from a LD 5 to pass through the filter and to enter a first optical waveguide 10 and not to allow light, contained in the light from the LD 5, with a wavelength of λ2 or so to pass therethrough.

As described above, according to the present invention, only by making the position of a photodiode shifted or the unwanted removal filter interposed on part of the optical waveguide, a waveguide-type wavelength multiplexing optical trans-mitter/receiver module having an excellent property can be implemented. This simple structure is suitable for mass production, thereby making the module lower-priced. It is thus apparent that the present invention is not limited to the above embodiments but may be changed and modified without departing from the scope and spirit of the invention.

Finally, the present application claims the priority of Japanese Patent Application No.Hei 10-127259 filed on May 11, 1998, which is herein incorporated by reference.

What is claimed is:

1. A waveguide-type wavelength multiplexing optical transmitter/receiver module comprising:

an optical demultiplexer;

an optical transmitter;

an optical receiver;

wherein said optical demultiplexer comprises an optical waveguide substrate and a filter, said optical waveguide substrate having a first optical waveguide, a second optical waveguide and a cross section at which said first optical waveguide and said second waveguide cross each other on a first end face of said optical waveguide substrate, said first optical waveguide and said second optical waveguide being disposed in respective positions opposite to each other relative to a cross axis normal to said first end face and passing through said cross section, said first optical waveguide having a first port to connect to said optical transmitter on a second end of said optical waveguide substrate, said second optical waveguide having a second port to connect to an optical fiber;

wherein said filter is disposed on said first end face of said optical waveguide substrate and reflects a first wavelength of light output from said optical transmitter such that said first wavelength of light is input to said second optical waveguide, and allows a second wavelength of light transmitted through said second optical waveguide from said optical fiber to pass through; and wherein said optical receiver is disposed such that a center axis of said optical receiver is shifted toward said first optical waveguide from said cross axis, whereby said optical receiver receives said second wavelength of light passing through said filter and avoids receiving an unwanted light output from said optical transmitter.

2. The waveguide-type wavelength multiplexing optical transmitter/receiver module according to claim 1, wherein said optical receiver is disposed so that the location of said center axis parallel to said cross axis.

3. The waveguide-type wavelength multiplexing optical transmitter/receiver module according to claim 1, wherein said optical receiver is disposed so that the center axis of said optical receiver intersects said cross axis at an angle.

4. A waveguide-type wavelength multiplexing optical transmitter/receiver module comprising:

an optical demultiplexer;

an optical transmitter;

an optical receiver;

a first filter;

wherein said optical demultiplexer comprises an optical waveguide substrate and a second filter, said optical waveguide substrate having a first optical waveguide, a second optical waveguide and a cross section at which said first optical waveguide and a said second waveguide cross each other on a first end of said optical waveguide substrate, said first optical waveguide and said second optical waveguide being disposed in respective positions opposite to each other relative to a cross axis normal to said first end and passing through said cross section, said first optical waveguide having a first port to connect to said optical transmitter on a second end of said optical waveguide substrate, said second optical waveguide having a second port used to connect to an optical fiber;

wherein said second filter is disposed on said first end of said optical waveguide substrate and reflects a first wavelength of light output from said optical transmitter such that said first wavelength of light is input to said second optical waveguide, and allows a second wavelength of light transmitted through said second optical waveguide from said optical fiber to pass through to said optical receiver; and wherein said second filter allows said first wavelength of light output from said optical transmitter to pass therethrough, and removes an unwanted light output from said optical transmitter.

5. The waveguide-type wavelength multiplexing optical transmitter/receiver module according to claim 1, wherein an unwanted light removal filter is interposed between said first port of said first optical waveguide and said cross section.

6. The waveguide-type wavelength multiplexing optical transmitter/receiver module according to claim 1, wherein said filter is a dielectric multilayer filter.

7. The waveguide-type wavelength multiplexing optical transmitter/receiver module according to claim 4, wherein said second filter is a directional coupler.

8. The waveguide-type wavelength multiplexing optical transmitter/receiver module according to claim 4, wherein said second filter is a Mach-Zehnder interferometer.

9. The waveguide-type wavelength multiplexing optical transmitter/receiver module according to claim 4, wherein said second filter is a dielectric multilayer filter.

10. The waveguide-type wavelength multiplexing optical transmitter/receiver module according to claim 4, wherein said second filter is a dielectric multilayer filter located within a groove formed across said first optical waveguide of said optical waveguide substrate.

11. The waveguide-type wavelength multiplexing optical transmitter/receiver module according to claim 1, wherein said optical waveguide substrate is a compound semiconductor selected from the group consisting of LiNbO3 (lithium niobate), Si (Silicon), GaAs (gallium arsenide), and InP (indium phosphide) substrates.

12. The waveguide-type wavelength multiplexing optical transmitter/receiver module according to claim 1, wherein said optical transmitter is a laser diode.

13. The waveguide-type wavelength multiplexing optical transmitter/receiver module according to claim 1, wherein said optical receiver is a photodiode.

14. A waveguide-type wavelength multiplexing optical transmitter/receiver module comprising:

an optical transmitter;

an optical receiver;

an optical demultiplexer, said optical demultiplexer including an optical waveguide substrate and a first filter, said optical waveguide substrate having a first optical waveguide, a second optical waveguide and a cross section at which said first optical waveguide and said second optical waveguide come nearer to each other on a first end of said optical wavelength substrate, said first optical waveguide having a first port configured to connect to said optical transmitter on a second end of said optical waveguide substrate, said second optical waveguide having second port configured to connect to an optical fiber, and said first filter disposed on said first end of said optical waveguide substrate, said first filter reflecting light with a first wavelength from said optical transmitter into said second optical waveguide and allowing light of a second wavelength from said optical fiber to pass through to said optical receiver;

a directional coupler adapted to couple light with said first wavelength from said optical transmitter; and a second filter interposed between said first port and said directional coupler, said second filter allowing light with said first wavelength from said optical transmitter to pass through said second filter and removing unwanted light.

15. The waveguide-type wavelength multiplexing optical transmitter/receiver module according to claim 14, wherein said first filter is a dielectric multilayer filter.

16. The waveguide-type wavelength multiplexing optical transmitter/receiver module according to claim 14, wherein said second filter is a directional coupler.

17. The waveguide-type wavelength multiplexing optical transmitter/receiver module according to claim 14, wherein said second filter is a Mach-Zehnder interferometer.

18. The waveguide-type wavelength multiplexing optical transmitter/receiver module according to claim 14, wherein said second filter is a dielectric multilayer filter.

19. The waveguide-type wavelength multiplexing optical transmitter/receiver module according to claim 14, wherein said second filter is a dielectric multilayer filter located within a groove formed across said first optical waveguide of said optical waveguide substrate.

20. The waveguide-type wavelength multiplexing optical transmitter/receiver module according to claim 14, wherein said optical waveguide substrate is a compound semiconductor selected from the group consisting of LiNbO3 (lithium niobate), Si (silicon), GaAs (gallium arsenide), and InP (indium phosphide) substrates.

* * * * *